(12) United States Patent
Takahashi et al.

(10) Patent No.: US 7,023,434 B2
(45) Date of Patent: Apr. 4, 2006

(54) IMAGE PROCESSING APPARATUS AND IMAGE PROCESSING PROGRAM

(75) Inventors: Hiroyuki Takahashi, Tokyo (JP); Shugo Takahashi, Tokyo (JP); Haruki Kodera, Tokyo (JP); Toshiharu Izuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 360 days.

(21) Appl. No.: 10/620,758

(22) Filed: Jul. 17, 2003

(65) Prior Publication Data

US 2005/0012740 A1    Jan. 20, 2005

(51) Int. Cl.
*G06T 15/00* (2006.01)

(52) U.S. Cl. .................. 345/419; 345/474; 345/582; 345/633

(58) Field of Classification Search ............. 345/419, 345/582, 474, 633; 463/3
See application file for complete search history.

(56) References Cited

U.S. PATENT DOCUMENTS

| | | | |
|---|---|---|---|
| 4,504,055 A | 3/1985 | Wells ........................ 463/3 |
| 4,951,230 A | 8/1990 | Dalrymple et al. ......... 364/521 |
| 5,146,557 A | 9/1992 | Yamrom et al. ............ 345/723 |
| 5,179,638 A | 1/1993 | Dawson et al. ............. 395/125 |
| 5,558,333 A * | 9/1996 | Kelson et al. .............. 473/131 |
| 5,841,441 A | 11/1998 | Smith ........................ 345/430 |
| 6,217,444 B1 | 4/2001 | Kataoka et al. | |
| 6,227,973 B1 | 5/2001 | Kikuchi ..................... 463/31 |
| 6,256,038 B1 | 7/2001 | Krishnamurthy ........... 345/419 |
| 6,277,973 B1 | 8/2001 | Jenkins et al. | |
| 6,292,193 B1 | 9/2001 | Perry et al. ................ 345/430 |
| 6,459,434 B1 | 10/2002 | Cohen et al. ............... 345/586 |
| 6,486,886 B1 | 11/2002 | Silverbrook et al. ....... 345/584 |
| 6,509,902 B1 | 1/2003 | Pfister et al. ............... 345/582 |
| 6,577,307 B1 | 6/2003 | Hsiao et al. ................ 345/422 |
| 6,767,282 B1 * | 7/2004 | Matsuyama et al. ......... 463/3 |
| 6,802,772 B1 * | 10/2004 | Kunzle et al. ................ 463/2 |
| 2001/0008840 A1 * | 7/2001 | Sugimoto ..................... 463/2 |
| 2002/0196263 A1 | 12/2002 | Muramori et al. .......... 245/582 |
| 2003/0040349 A1 * | 2/2003 | Imaeda et al. ................. 463/3 |

FOREIGN PATENT DOCUMENTS

| | | |
|---|---|---|
| JP | 9-237035 | 9/1997 |
| JP | 2000-024312 | 1/2000 |
| RU | 1146585 | 3/1985 |

OTHER PUBLICATIONS

Hot Shots Golf 3 Golfer's Handbook, 2002, SCEA, pp. 1-7, 10-17.*
Gamespot, Hot Shots Golf for PS2, http://www.gamespot.com/ps2/sports/hotshotsgolf3/.*
Maillot et al., "Interactive Texture Mapping", ©1993, ACM-0-89791-601-08/93/008.

* cited by examiner

*Primary Examiner*—Richard Hjerpe
*Assistant Examiner*—Said Broome
(74) *Attorney, Agent, or Firm*—Nixon & Vanderhey, PC

(57) ABSTRACT

An image processing apparatus includes a CPU, and the CPU renders a golf course in a 3-dimension virtual space in conjunction with a GPU. A grid for representing an inclination and undulations of a configuration of the golf course is also rendered. Specifically, a grid line is constructed by a series of grid line elements of plural number. With respect to each of sections of the grid, the number of the grid line elements is changed depending upon an inclination of each section, and rendering is performed as if the grid line itself flows throughout the grid at a constant speed.

26 Claims, 17 Drawing Sheets o ⋯ FIRST REFERENCE POINT (A) GRID LINE TEXTURE 1

LENGTH OF ONE SECTION (B) GRID LINE TEXTURE 2

(C) GRID LINE TEXTURE 3

(D) GRID LINE TEXTURE 4

TEXTURE TABLE

| SECTION NAME | GRID LINE TEXTURE NUMBER (N) |
|---|---|
| SECTION 1 | ... |
| SECTION 2 | ... |
| SECTION 3 | ... |
| ⋮ | ⋮ |
| SECTION n | ... |

(A) GRID LINE TEXTURE 3

(B) REPETITIVE TEXTURE

OFFSET=0

(C) PASTE ONTO SECTION
(0-TH FRAME)

(A) FIRST FRAME (B) FIRST FRAME (C) SECOND FRAME (D) SECOND FRAME (A) REFERENCE TEXTURE (B) REDUCED TEXTURE (C) REPETITIVE TEXTURE (D) PASTE ONTO SECTION
(0-TH FRAME)

(A) FIRST FRAME (B) FIRST FRAME (C) SECOND FRAME (D) SECOND FRAME

FIG. 16

TEXTURE TABLE

| SECTION NAME | THE NUMBER OF UNIT IMAGES |
|---|---|
| SECTION 1 | ... |
| SECTION 2 | ... |
| SECTION 3 | ... |
| ⋮ | ⋮ |
| SECTION n | ... |

IMAGE PROCESSING APPARATUS AND IMAGE PROCESSING PROGRAM

BACKGROUND OF THE INVENTION

1. Field of the Invention

The present invention relates to an image processing apparatus and an image processing program. More specifically, the present invention relates to an image processing apparatus and an image processing program which renders a 3-dimensional land object such as land object of a virtual golf course.

2. Description of the Prior Art

Conventionally, there is a golf game apparatus in which virtual golf is played on a 3-dimensional virtual golf course. In such a golf game apparatus, it is necessary to accurately and plainly provide a direction and degree of inclination for 3-dimensional configurations forming the golf course for a player. This is because in such a golf game apparatus, similar to golf in the real world, the direction and degree of the configurations are programmed so as to exert an influence on a movement of a ball and thus exert a great influence on a game play. However, a 3-dimensional land object is, if rendered on a display device such as a television monitor and etc., rendered in a 2-dimensional manner, and therefore, it is difficult to recognize the direction and degree of the inclination.

One example of a conventional golf game apparatus is disclosed in a Japanese Letters Patent No. 3410409. The golf game apparatus disclosed in the patent gazette displays guide lines (grid) on a configuration of a golf course in such a manner that luminance of the guide lines is changed depending upon undulations of the configuration.

Furthermore, another example of such a kind of golf game apparatus is well known. In such well-known golf game, a grid is displayed on a configuration of a golf course, and particles moving on the grid are displayed. The particles are displayed in such a manner that at a sharp inclination, the particles run fast, and at a gentle inclination, the particles run slowly.

However, in the golf game apparatus disclosed in the Japanese Letters Patent No. 3410409, since the undulation is represented only by the change of the luminance of the guide lines, in some cases it is difficult to recognize the undulation depending upon the color of the configuration of the golf course as a background. More specifically, a green area and a bunker area are different from each other in colors and it is difficult to recognize the luminance difference between areas having different background colors. Therefore, it is difficult to recognize the direction and degree of the inclination of the course. Furthermore, in a case of displaying a shadow of trees and so on of the golf course for the pursuit of reality, even in the same area, a luminance change caused by the shadow and a luminance change caused by the undulation are mixed with each other, and therefore, the same problem occurs. In addition, there is a problem that due to statically displaying the guide lines without motion, it is difficult to image how the golf ball rolls on the configuration of the golf course.

Furthermore, in the well-known golf game, there is a problem that since the degree of the inclination is provided by the moving speeds of the particles, it is impossible for the player to recognize the difference of the moving speeds without observing the particles closely during a certain amount of time period. Accordingly, in a case of knowing the degrees of the inclinations at a plurality of places on the golf course, it is necessary to recognize the moving speeds at respective places and therefore, it takes a certain amount of time period to recognize the degrees of the inclinations. The problem conspicuously occurs at a place where the moving speed of the particle is late, that is, the degree of the inclination is low.

In addition, it is necessary to display moving objects in addition to the grid. Furthermore, since the 3-dimensional land object, if rendered on the display device such as television monitor and etc., is displayed in a 2-dimensional manner, a depth of the golf course is represented by applying perspective on the display screen. Thus, lengths at the front and the back of the golf course are, even if they have the same distance, different from each other on the display screen, and therefore, even at the same speed, a place at the front and a place at the back are different from each other in speed, and thus, it is difficult to compare the speed of the particles at the front with that at the back. Thus, it is difficult to compare the gradient at the front position with that at the back position. Furthermore, in a case the particles move in the depth direction, it is very difficult to recognize the speed thereof and therefore, it is difficult to recognize the gradient.

SUMMARY OF THE INVENTION

Therefore, the exemplary embodiments of the present invention provide a game apparatus and a game program capable of recognizing a configuration with ease.

Furthermore, the exemplary embodiments of the present invention provide a golf game apparatus capable of momentarily recognizing a degree of an inclination of a golf course and rapidly performing a progress of a game play.

One example image processing apparatus includes a land object rendering means for rendering a land object in a 3-dimension virtual space and a grid rendering means for rendering a grid on a surface of the land object. In the image processing apparatus, the grid rendering means displays the grid by combining a plurality of grid lines with each other in vertical and horizontal directions, the grid includes a plurality of sections sectioned by intersecting points of the grid lines in the vertical direction and in the horizontal direction, and each of the plurality of grid lines is constructed by a series of grid line elements which are elements for forming the grid line in a plural number. The grid rendering means includes the number of elements determining means for making the number of the grid line elements included in each of the sections different depending upon a gradient of the surface of the land object at a position corresponding to each of the sections so that the grid lines of the vertical direction and the grid lines of the horizontal direction can be displayed, and a flow rendering means for performing rendering as if the grid lines each formed by the grid line elements having the number determined by the number of elements determining means flow toward an inclined direction at a constant speed on the surface of the land object.

In the illustrative example embodiment described in greater detail below, an image processing apparatus is provided with land object rendering means and grid rendering means. The land object rendering means renders the land object in the 3-dimension virtual space. Furthermore, the grid rendering means renders (displays) the grid on the surface of the land object by combination of the plurality of grid lines in the vertical and horizontal directions. The grid includes the plurality of sections sectioned by the intersecting points of the grid lines in the vertical and horizontal directions, and each of the plurality of grid lines is constructed by the series of grid line elements being elements for forming the grid line. The number of elements determining means makes the number of the grid line elements included in each of the sections different depending upon the gradient of the surface of the land object at a position corresponding to each of the sections. For example, the larger the gradient is, the more the number of the grid line elements increases. Thus, the grid line constructed by the grid line elements having the number determined by the number of elements determining means is rendered so as to flow toward an inclined direction at a constant speed on the surface of the land object by the flow rendering means.

The number of the grid line elements for forming the grid line is changed depending upon the gradient, and therefore, this allows the user to easily recognize the gradient of the land object. That is, in a case of representing the gradient by moving speeds of the objects, it takes a certain amount of time to recognize the moving speed; however, it is not necessary to recognize a variation with time such as moving speed, and therefore, it is possible to know the degree of the inclination of the land object in a short time period.

Furthermore, the inclined direction can be recognized by a direction of the flow of the grid line itself in each section. Then, a speed of the flow of the grid line itself is the same and constant throughout the grid, and therefore, movement of the eyes, when the player views different points within the grid, becomes natural. This makes it possible to provide a screen viewable by the player with ease. The gradients at a plurality of points can be compared with ease by comparing the number of the grid line elements at these points.

In addition, each of the sections includes the grid line elements of the number in correspondence to the gradient, rendering is performed such that each of the grid lines flows at the constant speed throughout the grid, and therefore, the number of the grid elements reach to the end point of each section per a predetermined time period is different depending on the gradient, and this enables the player to intuitively recognize the gradient.

A grid line element changing means may change a length of the grid line element depending upon the number determined by the number of elements determining means, wherein the flow rendering means performs rendering as if the grid lines each having the series of grid line elements changed in length by the grid line element changing means flow toward the inclined direction of the surface of the land object at the constant speed.

The grid line element changing means changes the length of the grid line element depending upon the number determined by the number of elements determining means. The flow rendering means performs rendering as if the grid lines each having the series of grid line elements changed in length by the grid line element changing means flow toward the inclined direction of the surface of the land object at the constant speed.

The inclined direction can be recognized by a direction of a flow of the grid line itself on each section. Then, a speed of the flow of the grid line itself is the same and constant throughout the grid, and therefore, movement of the eyes, when the player views different points within the grid, becomes natural. This makes it possible to provide a screen viewable by the player with ease. The gradients at a plurality of points can be compared with ease by comparing the number of grid line elements at these points.

In addition, each of the sections includes the grid line elements of the number in correspondence to the gradient, and each of the grid lines is rendered so as to flow at the constant speed throughout the grid, and therefore the number of the unit images reached to the end point of each section per a predetermined time period is different depending on the gradient, and this enables the player to intuitively recognize the gradient.

The grid line elements can have visual directivity, and the flow rendering means performs rendering such that a front direction of the grid line elements becomes coincident with the inclined direction of the surface of the land object.

The grid line elements can have, for example, visual directivity, and the flow rendering means performs rendering the grid line elements in such a manner that the front direction of the grid line elements becomes coincident with the inclined direction of the surface of the land object.

The inclined direction can be informed by the direction of the grid line element, and therefore, it is possible to recognize the inclined direction in a short time period.

The land object may be a land object of a virtual golf course, and the example embodiment further comprises an operating means for inputting operating information by a player, wherein a virtual golf game is performed in the golf course in response to an operation of the operating means.

The land object may be the land object of a virtual golf course. The player performs the virtual golf game in the golf course by operating the operating means. That is, a configuration in the vicinity of a falling point of a golf ball to be predicted and the inclination of the green are represented by the grid.

The golf game has great necessity to easily and rapidly provide the gradient and the inclined direction of the land object for the player, and therefore, the golf game has high advantage when using the example embodiment.

An example image processing program may be executed by an image processing apparatus having a land object rendering means for rendering a land object in a 3-dimension virtual space and a grid rendering means for rendering a grid on a surface of the land object. The image processing program makes the grid rendering means execute a displaying step for displaying the grid by combining a plurality of grid lines with each other in vertical and horizontal directions, the grid including a plurality of sections sectioned by intersecting points of the grid lines of the vertical direction and the grid lines of the horizontal direction, each of the plurality of grid lines being constructed by a series of grid line elements being elements for forming the grid line in a plural number, and the number of elements determining step for making the number of the grid line elements included in each of the sections different depending upon a gradient of the surface of the land object at a position corresponding to each of the sections so that the grid lines of the vertical direction and the grid lines of the horizontal direction can be displayed, and a flow rendering step for performing rendering as if the grid lines each formed by the grid line elements having the number determined by the number of elements determining step flow toward an inclined direction at the constant speed on the surface of the land object.

It is therefore possible to rapidly and easily recognize the configuration.

According to the example embodiments, the number of the grid line elements forming the grid line is changed depending upon the gradient of each section, and this allows the player to easily and rapidly recognize the gradient.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing one example of a texture table;

FIG. 16 is an illustrative view showing a texture table of FIG. 14 embodiment.

DETAILED DESCRIPTION OF THE EXAMPLE EMBODIMENTS

Figure 1:
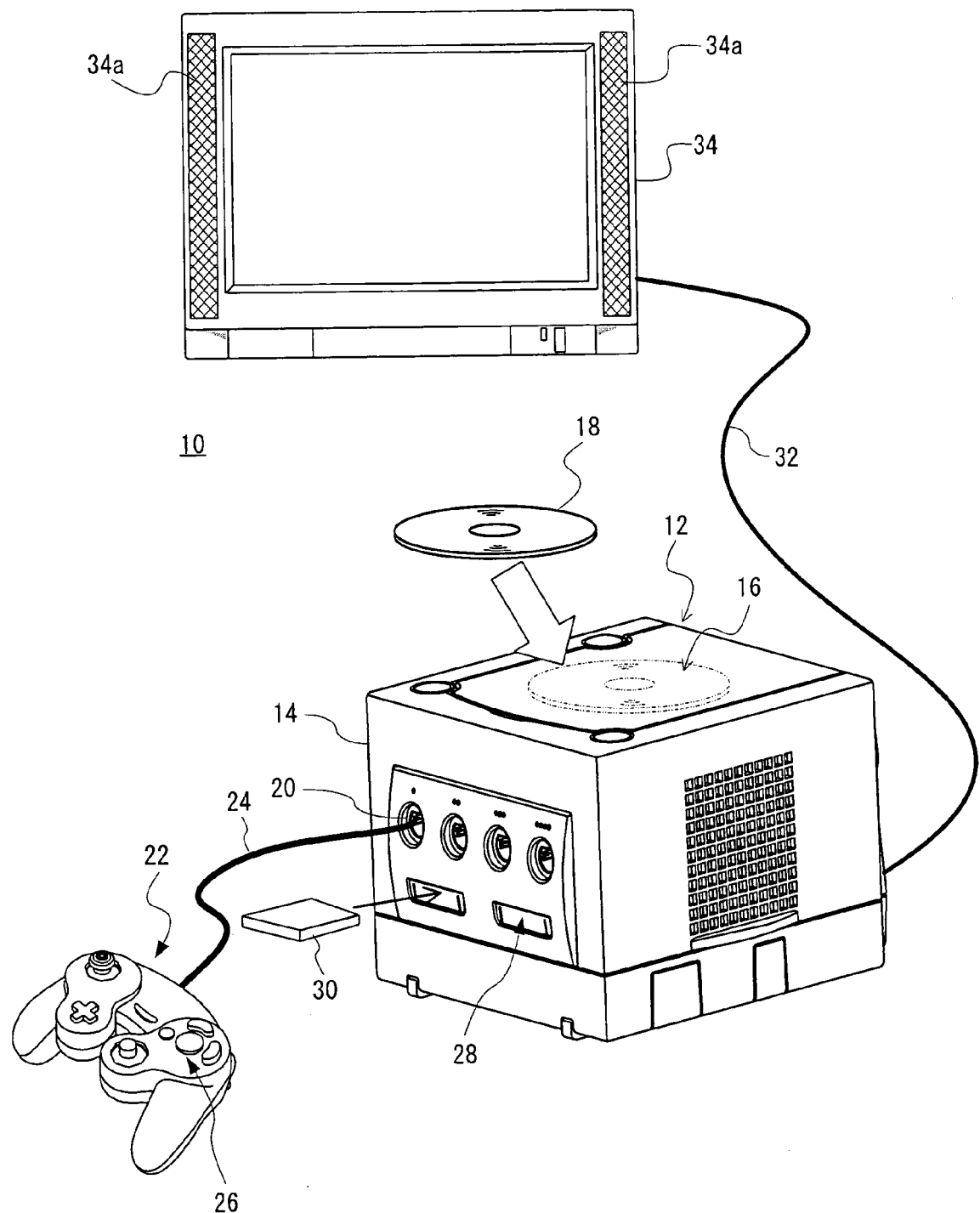
FIG. 1 is an illustrative view showing a game system of one embodiment of the present invention.

Referring to FIG. 1, a video game system 10 of an embodiment of the present invention includes a video game machine 12. The video game machine 12 is supplied with a power source, and the power source may be a general AC adapter (not shown) in this embodiment. The AC adapter is inserted to a standard wall socket for home use, and a power source for home use is converted into a low DC voltage signal suitable for driving the video game machine 12. In another embodiment, a battery may be utilized as the power source.

The video game machine 12 includes an approximately cubic housing 14, and the housing 14 is provided with an optical disk drive 16 on an upper surface thereof. An optical disk 18 which is one example of an information recording medium storing a game program is loaded on the optical disk drive 16. The housing 14 is provided with a plurality of connectors 20 (four, in this embodiment) on a front surface thereof. These connectors 20 are for connecting a controller 22 to the video game machine 12 by a cable 24 and can connect up to four controllers to the video game machine 12 in this embodiment.

The controller 22 is provided with an operating portion (operating switch) 26 on upper, lower and lateral sides thereof. The operating portion 26 includes, for example, two analog joysticks, one cross key, a plurality of button switches and so on. One analog joystick is utilized for inputting a moving direction and/or a moving speed, a moving amount and etc. of a player character (moving character operable by the controller 22 by the player) according to an amount of inclination and a direction of the stick. The other analog joystick is utilized for controlling movement of a virtual camera according to a direction of an inclination thereof. The cross key is utilized for instructing a moving direction of the player character in place of the analog joystick. The button switches are utilized for instructing movement of the player character, switching a point of view of the virtual camera in the 3-dimension image, adjusting the moving speed of the player character and etc. The button switches further control, for example, a menu selection and movement of a pointer or a cursor.

It is noted that the controller 22 is by a cable 24 integrated therewith connected to the video game machine 12 in this embodiment. However, the controller 22 may be connected to the video game machine 12 via an electromagnetic wave (e.g., radio wave or infrared ray) in a wireless manner. Furthermore, detailed structure of the operating portion 26 of the controller 22 is, of course, not limited to the structure of the embodiment and can be arbitrarily changed or modified. For example, only one analog joystick may be utilized or no analog joystick may be utilized. The cross key may not be utilized.

One or more (two, in this embodiment) memory slots 28 are provided below the connectors 20 on the front surface of the housing 14 of the video game machine 12. A memory card 30 is inserted to this memory slot 28. The memory card 30 is utilized for loading the game program and etc. read from the optical disk 18 so as to temporarily store, or saving game data (e.g., result of a game) of the game that the player plays by utilizing the game system 10.

The housing 14 of the video game machine 12 is, on a rear surface thereof, provided with an AV cable connector (not shown) with which a monitor 34 is connected to the video game machine 12 through an AV cable 32. The monitor 34 is typically a color television receiver, and the AV cable 32 inputs a video signal from the video game machine 12 to a video input terminal of the color television and applies a sound signal to a sound input terminal. Accordingly, a game image of a 3-dimension (3D) video game, for example, is displayed on a screen of the color television (monitor 34), and a stereo game sound such as game music, a sound effect and etc. is output from right and left speakers, or in a case a surround-sound effect can be output even with two speakers, a game sound including a surround sound is output.

In the game system 10, a user or a game player turns on an electric power source of the video game machine 12 in order to play a game (or another application), and then, selects a suitable optical disk 18 storing a video game (or another application intended to play), and loads the optical disk 18 on the disk drive 16 of the video game machine 12. In response thereto, the video game machine 12 starts to execute the video game or other application on the basis of software stored in the optical disk 18. The user operates the controller 22 so as to apply an input to the video game machine 12. For example, by operating any one part of the operating portion 26, the game or other application is started. By moving another part of the operating portion 26, it is possible to move the moving image character (player character) toward different directions and to change the point of eye of the user (camera position) in the 3-dimension (3D) game world.

Figure 2:
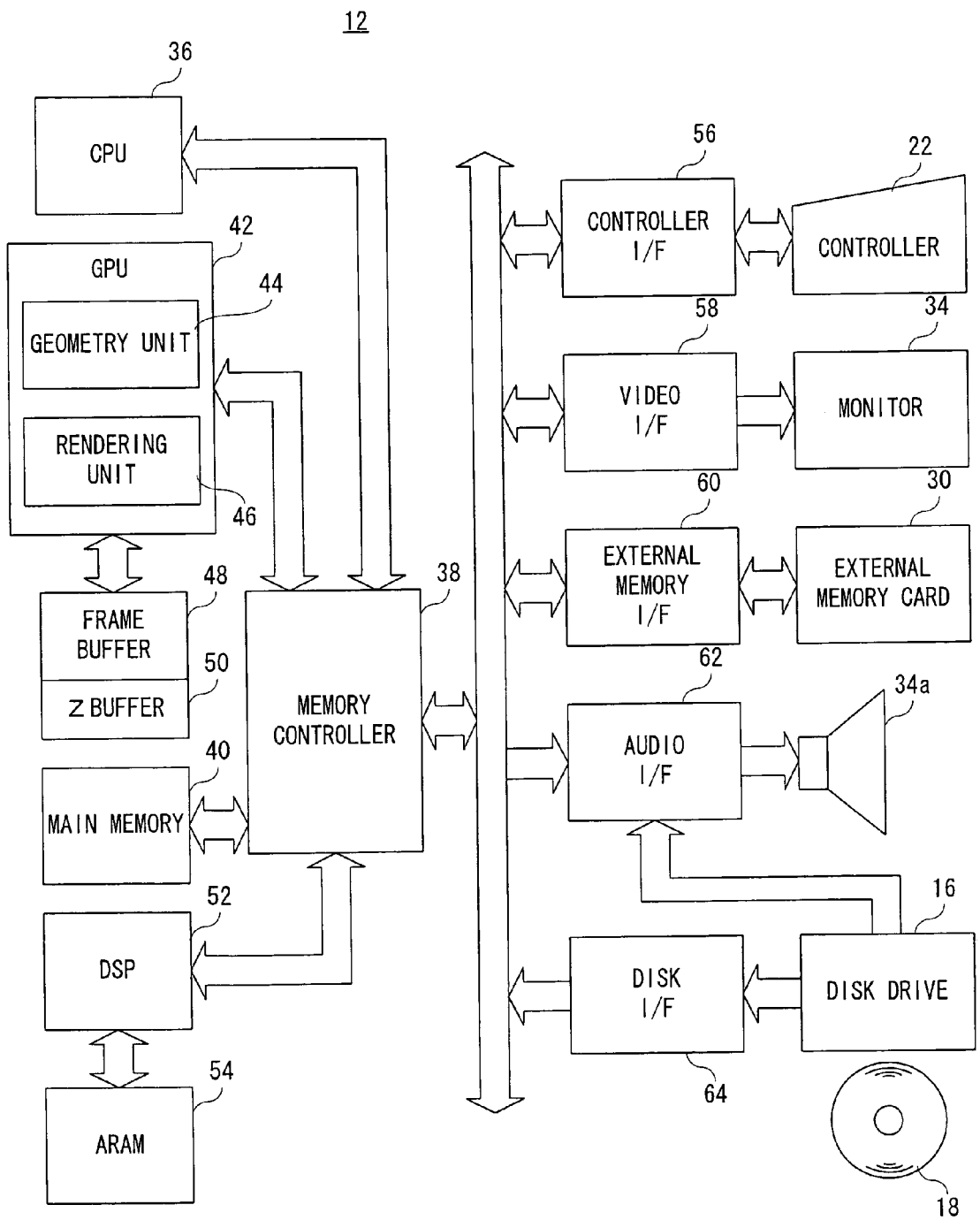
FIG. 2 is a block diagram showing electrical structure of a video game apparatus shown in FIG. 1.

FIG. 2 is a block diagram showing a configuration of the video game system 10 of the FIG. 1 embodiment. The video game machine 12 is provided with a central processing unit (hereinafter, may be referred to as "CPU") 36. The CPU 36 is also called a computer or a processor and is for taking charge of overall control of the video game machine 12. The CPU 36 or computer functions as a game processor and is connected with a memory controller 38 via a bus. The memory controller 38 mainly controls writing and reading of a main memory 40 connected via a bus under control of the CPU 36. The memory controller 38 is coupled with a GPU (Graphics Processing Unit) 42.

The GPU 42 forms a part of rendering means, is constructed by, for example, a single chip ASIC, receives a graphics command (a construction command) from the CPU 36 via the memory controller 38 and then, in response to the command, generates the 3-dimension (3D) game image by a geometry unit 44 and a rendering unit 46. Specifically, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in 3-dimension coordinates system. The rendering unit 46 performs an image generating process such as pasting a texture (pattern image) on each of polygons of the variety of objects. Accordingly, 3-dimension image data to be displayed on the game screen is produced by the GPU 42, and the image data is stored in a frame buffer 48.

It is noted that data (primitive or polygon, texture and etc.) desired to execute the construction command by the GPU 42 is acquired from the main memory 40 via the memory controller 38.

The frame buffer 48 is a memory for rendering (accumulating) the image data of one frame, for example, of the raster scan monitor 34 and is rewritten by the GPU 42 at every one frame. A video I/F 58 described later reads the data stored in the frame buffer 48 through the memory controller 38, whereby a 3D game image can be displayed on the screen of the monitor 34.

Furthermore, a Z buffer 50 has a storage capacity equal to "the number of pixels corresponding to the frame buffer 48×the number of bits of depth data per one pixel", and stores depth information or depth data (Z value) of dots corresponding to respective storing positions of the frame buffer 48.

It is noted that both of the frame buffer 48 and the Z buffer 50 may be constructed by a portion of the main memory 40.

The memory controller 38 is also connected to an ARAM 54 via a DSP (Digital Signal Processor) 52. Accordingly, the memory controller 38 controls writing and/or reading of the ARAM 54 as a sub-memory in addition to the main memory 40.

The DSP 52 functions as a sound processor and generates a sound required for the game or audio data corresponding to the sound or the music by use of sound data (see FIG. 3) stored in the main memory 40 or sound wave data (not shown) written in the ARAM 54.

The memory controller 38 is further connected to respective interfaces (I/F) 56, 58, 60, 62 and 64 by buses. The controller I/F 56 is an interface for the controller 22 and applies an operation signal or data of the operating portion 26 of the controller 22 to the CPU 36 through the memory controller 38. The video I/F 58 accesses the frame buffer 48 to read the image data formed by the GPU 42 and then applies the image signal or the image data (digital RGB pixel values) to the monitor 34 via the AV cable 32 (FIG. 1).

The external memory I/F 60 makes the memory card 30 (FIG. 1) which is inserted to the front surface of the video game machine 12 communicate to the memory controller 38. This allows the CPU 36 to write the data to the memory card 30 (FIG. 1) or read the data from the memory card 30 via the memory controller 38. The audio I/F 62 receives the audio data applied from the DSP 52 through the memory controller 38 or an audio stream read from the optical disk 18, and then in response thereto applies an audio signal (sound signal) to the speakers 34a of the monitor 34.

It is noted that for stereo sound, the speakers 34a are provided for at least right and left. In addition, by use of the surround-sound processing, it is possible to make a person hear a sound as if the sound is generated from a rear direction even with two speakers at the right and the left.

Then, the disk I/F 64 connects the disk drive 16 to the memory controller 38, and whereby, the CPU 36 controls the disk driver 16. The disk driver 16 writes program data, texture data and etc. read from the optical disk 18 to the main memory 40 under control of the CPU 36.

Figure 3:
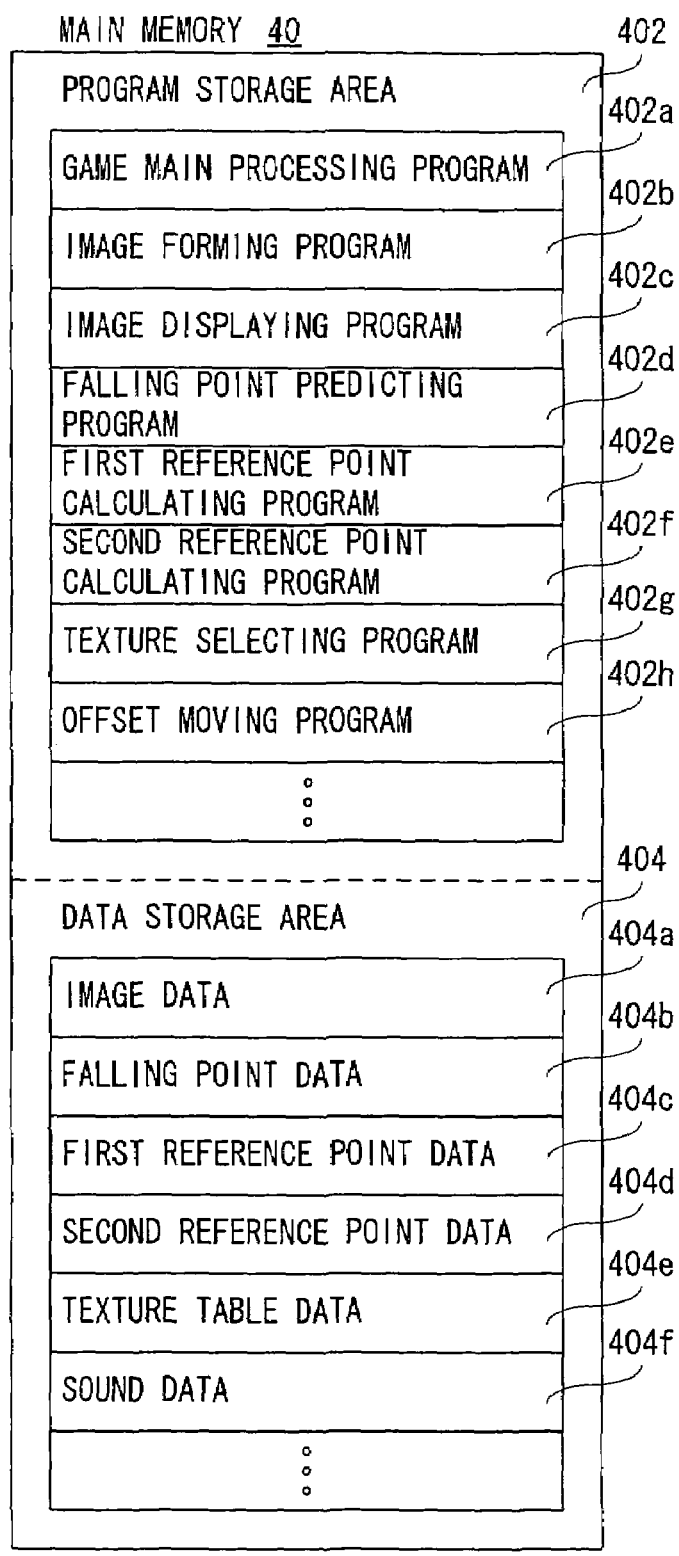
FIG. 3 is an illustrative view showing a memory map of a main memory shown in FIG. 2.

FIG. 3 shows a memory map of the main memory 40. The main memory 40 includes a program storage area 402 and a data storage area 404. The program storage area 402 is stored with a game main processing program 402a, an image forming program 402b, an image displaying program 402c, a falling point predicting program 402d, a first reference points calculating program 402e, a second reference points calculating program 402f, a texture selecting program 402g, an offset moving program 402h and etc.

The game main processing program 402a is a program for processing a main routine as to a game (golf game, in this embodiment) executed by the video game machine 12. The image forming program 402b is a program for forming a game image such as a course of the golf game (background image), person characters such as player character and enemy character (opponent) and etc. appearing in the golf game, characters of implements (golf club, golf ball and etc.) utilized by the person character (implement character) and etc. The image displaying program 402c is a program for displaying the game image formed by the image forming program 402b on the monitor 34.

The falling point predicting program 402d is a program for predicting a falling point in a case the player character hits a golf ball, for example, on the basis of a direction of one's eyes of the player character (a direction to which one intends to hit the golf ball), a kind of a golf club to be utilized by the player character, characteristic of the player character (physical strength, level and etc.) and weather conditions (rainfall, volume of air, direction of the wind and etc.).

Figure 4:
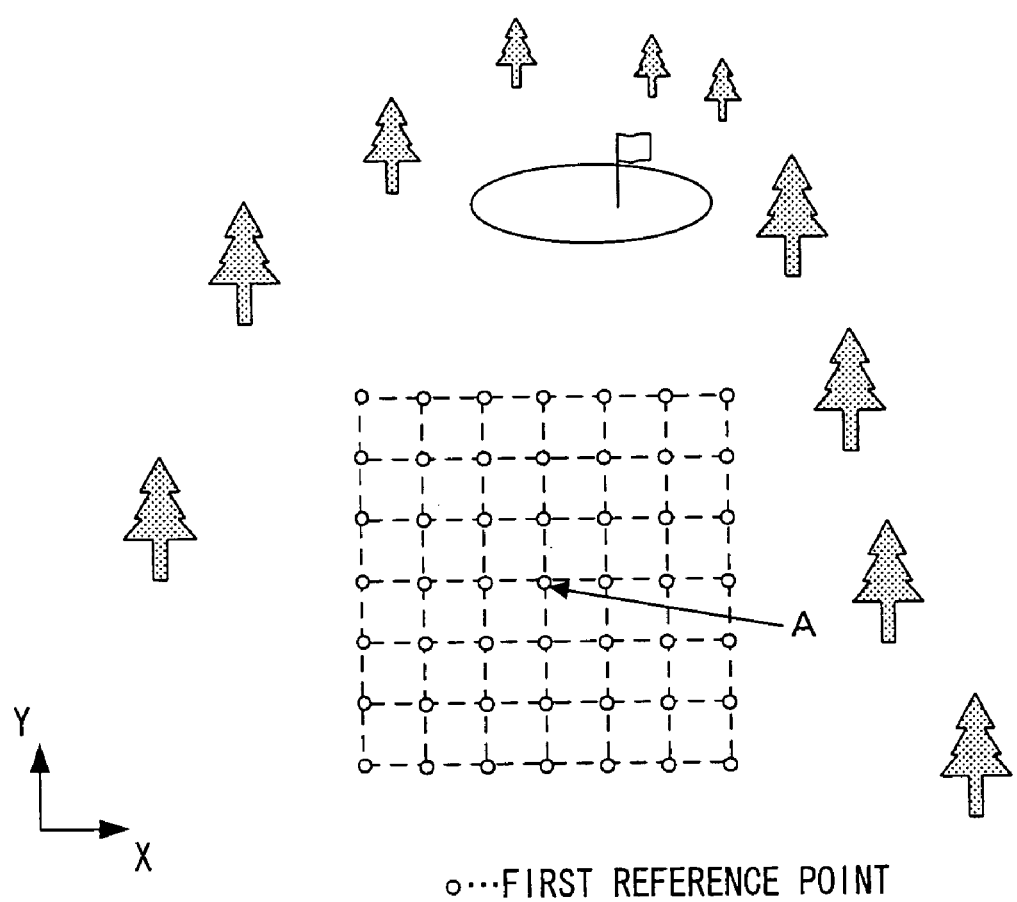
FIG. 4 is an illustrative view showing a falling point and first reference points around it both calculated in a case of displaying a grid image.

The first reference points calculating program 402e is a program for calculating, by making the falling point predicted by the falling point predicting program 402d as a center, a plurality of reference points (first reference points) on the 2-dimensional plane (plane viewed from directly above) around the center. In this embodiment, as shown in FIG. 4, when a falling point A in the golf course is predicted, the first reference points are calculated so that a 7 by 7 matrix of points is formed by making the falling point as a center. The first reference points are 2-dimensional coordinate values having X coordinates and Y coordinates. Then, respective spaces between adjacent first reference points are equal to each other (predetermined distance). It is noted that the predicted falling point A is also included in the first reference points.

Figure 5:
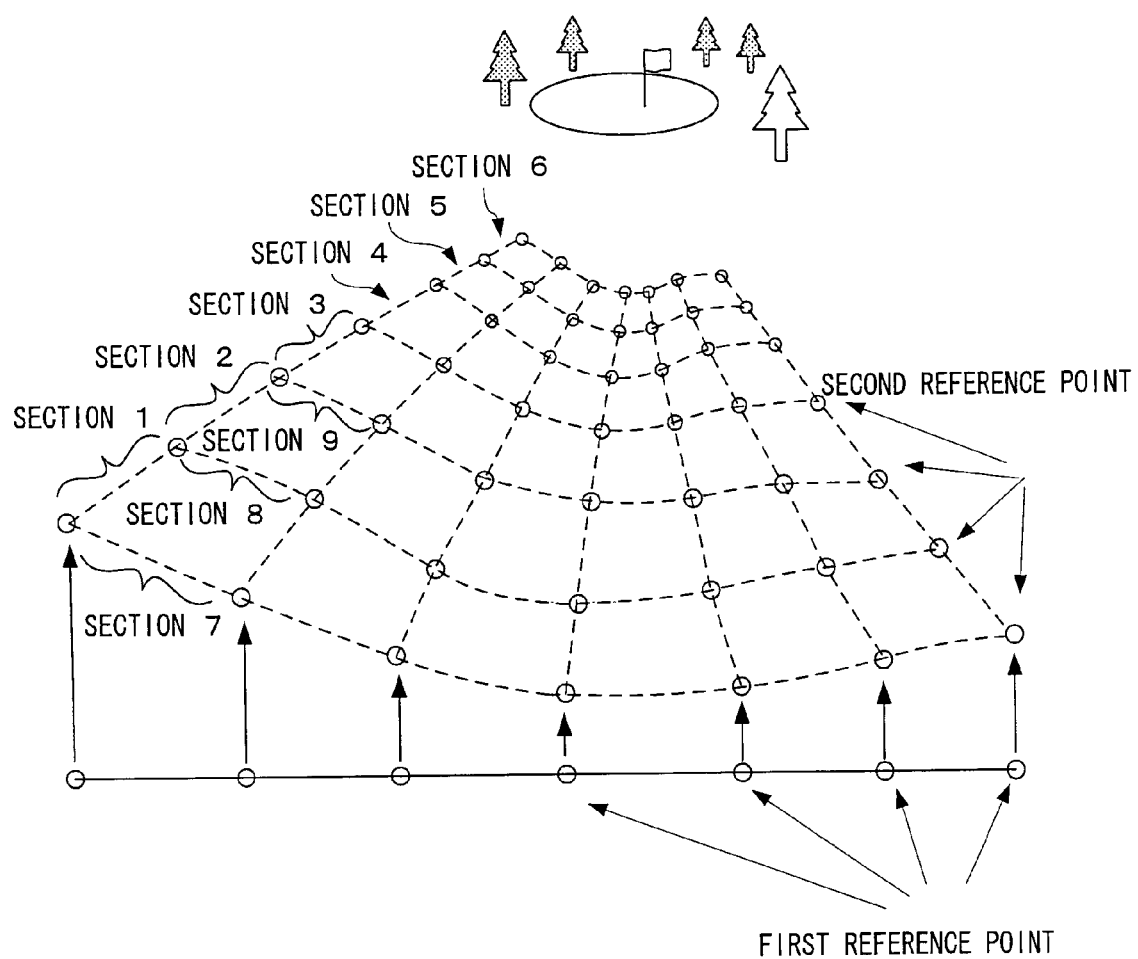
FIG. 5 is an illustrative view showing a second reference point calculated based on the first reference point shown in FIG. 4.

The second reference points calculating program 402f is a program for calculating intersecting points (second reference points) obtained by extending respective ones of the plurality of first reference points calculated by the first reference points calculating program 402e in a Z axis direction (direction of height) and crossing a configuration (surface) of the golf course with the extended points. Accordingly, as shown in FIG. 5, for example, the second reference points according to inclinations (undulations) of the configuration of the golf course are determined (calculated). That is, the matrix formed by the first reference points shown in FIG. 4 is projected on the configuration surface of the golf course. Accordingly, the second reference points calculating program 402f adds information in the Z axis direction (Z coordinate) to the X coordinates and the Y coordinates of the first reference points calculated by the first reference points calculating program 402e.

The texture selecting program 402g is a program for selecting a texture of grid line and is a program for selecting a texture (see FIG. 6) to be pasted on each of all sections n (n is a natural number) of the grid shown in FIG. 5. Herein, the section is a part sectioned by the intersecting points (second reference points) of a vertical grid line and a horizontal grid line. The offset moving program 402h is a program for moving a head position (offset) for cutting by a predetermined value one part to be pasted on the section n from a repetitive texture which is a repetition of the texture selected by the texture selecting program 402g.

Returning to FIG. 3, the data storage area 404 stores image data 404a, falling point data 404b, first reference points data 404c, second reference points data 404d, texture table data 404e, sound data 404f and etc.

The image data 404a is data such as polygon data and texture data for displaying the game screen. More specifically, the image data 404a is image data of the person characters appearing in the golf game, image data of the implement characters, and image data of variety of objects such as background objects including a golf course having fairway, rough, banker, green, trees, pond and etc. Furthermore, image data of an image displayed for guiding the player during the game is also included. For example, this includes image data for informing weather conditions, image data indicative of the golf club now being selected, image data indicative of an outline of the golf course, image data indicative of intensity of a swing and a hit position and image data indicative of the configuration near the falling point or its inclination.

The falling point data 404b is coordinates data of the falling point predicted by the falling point predicting program 402d. In this embodiment, the falling point data 404d is data of the X coordinates and the Y coordinates. The first reference points data 404c is coordinates data of the plurality of first reference points calculated by the first reference points calculating program 402e on the basis of the falling point data 404b. As described above, the first reference points data 404c is the data of the X coordinate and the Y coordinate as to each of the plurality of first reference points. The second reference points data 404d is coordinates data of the second reference points calculated by the second reference points calculating program 402f on the basis of the first reference points data 404c. As described above, the second reference points data 404d is data of X coordinate, Y coordinate and Z coordinate of each of the plurality of second reference points.

The texture table data 404e is table data (see FIG. 8) describing a kind (number) of the grid line texture to be pasted on each section n selected by the texture selecting program 402g. The sound data 404f is data of a sound (music) such as music played during the game (BGM) or sound effect.

It is noted that although the illustration is omitted, the data storage area 404 is stored with game data, flag data and etc. generated as the game progresses.

For example, in the game system 10 of this embodiment, the golf game is playable. In the golf game, a rolling direction of the golf ball is affected by a form of the configuration, i.e., an inclination and undulations of the ground. This exerts an influence upon a score of the golf game and becomes a big concern to the player. However, since the 3-dimensional land object (golf course) is, if rendered on the display device such as television monitor and etc., represented in a 2-dimensional manner, and therefore, it is difficult to recognize a direction and a degree of the inclination. Thus, in such a golf game, generally, the grid is displayed around the predicted falling point of the golf ball in the fairway, and on the surface of the green so as to make the inclination and the undulations of the configuration recognizable.

As one example, there is one which displays the guide lines (grid) by changing the intensities or luminance of the lines depending upon the differences of the vertical levels or one which displays particles moving on the grid lines at different speeds depending upon the degree of the inclination.

However, when the vertical level difference is represented only by the change of the luminance of the guide lines, in some cases it is difficult to recognize the vertical level difference depending upon the color of the configuration of the golf course as a background. More specifically, a green area and a bunker area are different in colors and it is difficult to recognize the luminance difference between areas having different background colors. Therefore, it is difficult to recognize the direction and the degree of the inclination of the course. Furthermore, even in the same area, in a case of displaying a shadow of trees and etc. of the golf course for the pursuit of reality, a luminance change caused by the shadow and a luminance change caused by the vertical level difference are mixed with each other, and therefore, the same problem occurs. In addition, there is a problem that due to statically displaying the guide lines without motion, it is difficult to image how the golf ball rolls on the configuration of the golf course.

Furthermore, there is a problem that when the degree of the inclination is provided by the moving speeds of the particles, it is impossible for the player to recognize the difference of the moving speeds without observing the particles closely during a certain amount of time. Accordingly, in a case of knowing the degrees of the inclinations at a plurality of places on the golf course, it is necessary to recognize the moving speeds at respective places and therefore, it takes a certain amount of time period to recognize the degrees of the inclinations. The problem conspicuously occurs at a place where the moving speed of the particle is late, that is, the degree of the inclination is low.

In addition, it is necessary to display moving objects in addition to the grid. Furthermore, since the 3-dimensional land object, in a case of being rendered on the display apparatus such as television monitor and etc., is displayed in a 2-dimensional manner, depth of the golf course is represented by applying perspective on the display screen. Thus, the front and the back of the golf course is, even though they have the same distance, different in length on the screen and therefore, it is difficult for the player to make the degrees of the inclinations understandable by speeds of the moving objects.

To prevent this, in this embodiment, the number of the grid line elements forming the grid line is changed depending upon the degree of the inclination, and the grid line itself is moved at a constant speed in an inclined direction. It is noted that the number of grid line elements is changed by pasting grid line textures being different in number in this embodiment. A detailed description is made as follows.

Figure 6:
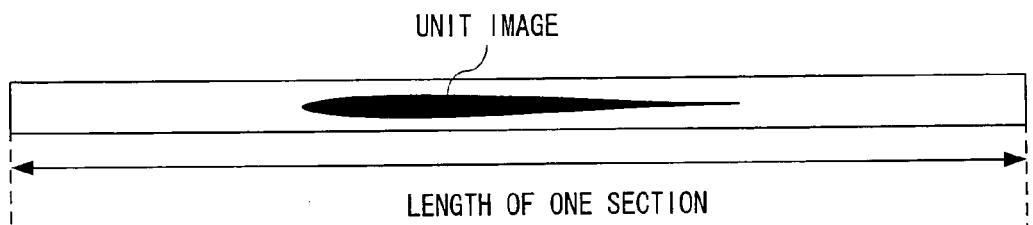
FIG. 6 is an illustrative view showing one example of grid line textures.
Figure 6:
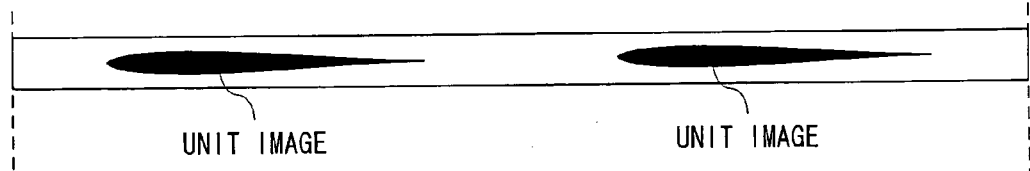
Figure 6:
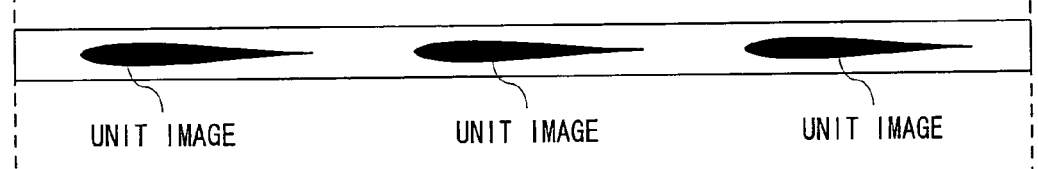
Figure 6:
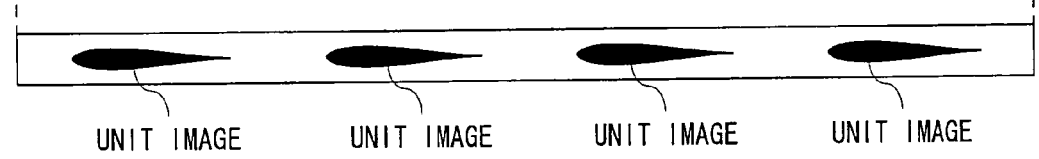

In FIG. 6 (A) to FIG. 6 (D), grid line textures N(N is a natural number) to be pasted on the sections n are shown. Each of the grid line textures N shown in FIG. 6 (A) to FIG. 6 (D) has a length corresponding to the length of one section. Furthermore, each of the grid line textures N has its head at a left side of the drawings and its tail at a right side of the drawings.

As shown in FIG. 6 (A), a grid line texture 1 includes one black grid element (unit image) at the center thereof, and is colorless transparent except for that. Herein, the unit image is a streamlined shape and represents directivity by making the tail of the grid line texture 1 thinner than the head thereof. It is noted that the unit image is not necessarily limited to black, may be white, and may be changeable depending upon the background image. A color which is not confused with the color of the background image may be adopted. In addition, as understood from FIG. 6 (A) to FIG. 6 (D), all the unit images are the same in shape but are different in dimension depending on the number of the unit images included in the grid line texture N.

A grid line texture 2 shown in FIG. 6 (B) includes two black unit images, and is colorless transparent except for that. For example, a space from the head of the grid line texture 2 to the unit image placed at the left side and a space from the unit image placed at the right side to the tail of the grid line texture 2 are equal to each other, and a space between adjacent unit images is made twice the spaces. This, as described later, is because the adjacent unit images are made to have the same spaces when repeating the grid line texture. The same is true for the following description.

A grid line texture 3 shown in FIG. 6 (C) includes three black unit images, and is colorless transparent except for that. A space from the head of the grid line texture 3 to the unit image placed at the left side and a space from the unit image placed at the right side to the tail of the grid line texture 3 are equal to each other, and a space between adjacent unit images is made twice the spaces.

A grid line texture 4 shown in FIG. 6(D) includes four black unit images, and is colorless transparent except for that. A space from the head of the grid line texture 4 to the unit image placed at the left side and a space from the unit image placed at the right side to the tail of the grid line texture 4 are equal to each other, and a space between adjacent unit images is made twice the spaces.

Although an illustration is omitted, the grid line texture including the unit images more than four are also prepared.

Figure 7:
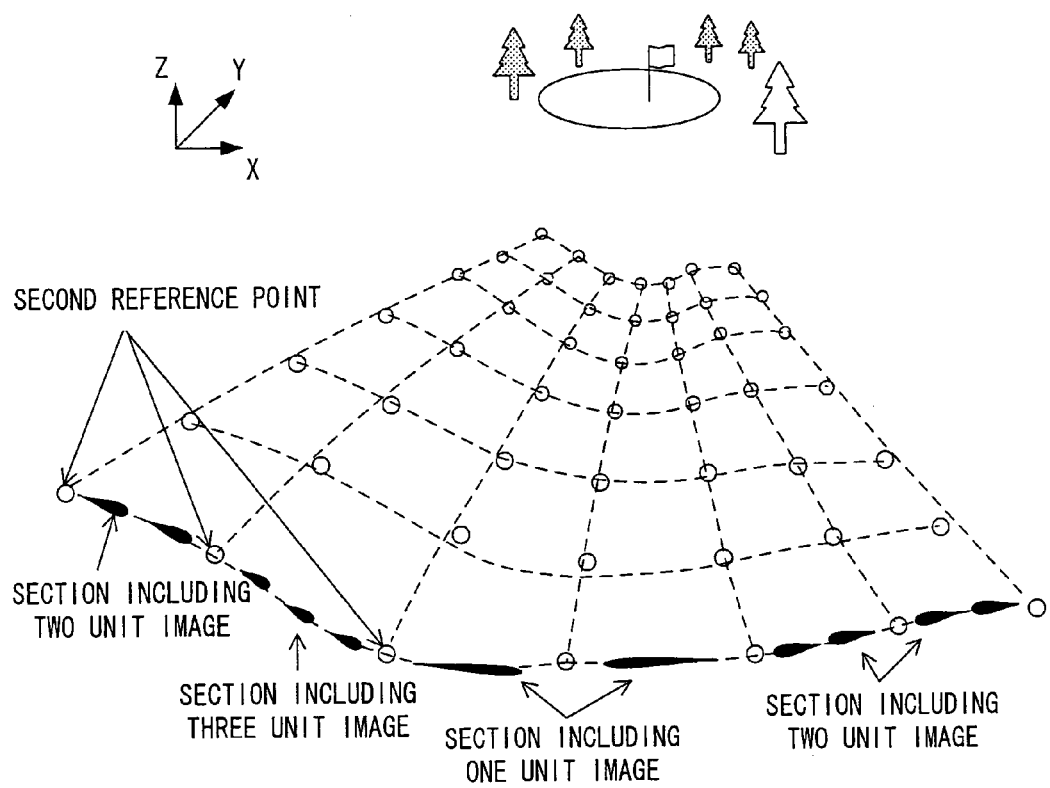
FIG. 7 is an illustrative view describing a selecting method of a grid line texture to be pasted on each section.
Figure 7:
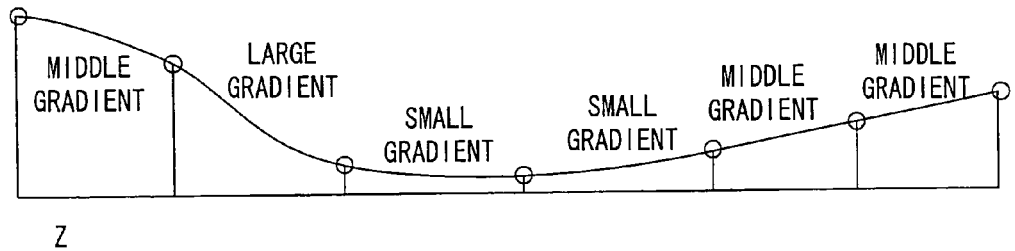

Such the grid line texture N is selectable of the kind (number) depending upon the degree of the inclination (hereinafter, referred to as "gradient") as to the sections n. For example, explaining by use of the grid line textures 1 to 3, as shown in FIG. 7 (A) and FIG. 7 (B), in a case of a small gradient, the grid line texture 1 is selected. Furthermore, in a case of a middle gradient, the grid line texture 2 is selected. In addition, in a case of a large gradient, the grid line texture 3 is selected. That is, the grid line texture N is selected such that as the larger the gradient is, the more the number of the unit images increases.

It is noted FIG. 7 (B) shows a vertical sectional view of the grid in a front row.

In this embodiment, the grid line texture N with respect to the gradient is determined in advance, and the gradient is obtained from the distances in a X axis direction and in a Y axis direction (a predetermined direction in this embodiment) as to two second reference points forming the sections n and the differences in height of the X axis direction and the Y axis direction. Specifically, a texture table shown in FIG. 8 is prepared, and the number (N) of the selected grid line texture is registered therein from the section 1 in order. It is noted that the number of the section may be fixedly determined in advance and may also be determined each time. For example, as shown in FIG. 5, a section which is the nearest at the left side from a viewpoint position is regarded as a section 1, and the sections may have numbers in an increasing order such as 2, 3, 4, ... toward a deep direction, and alternatively, the sections may have numbers in an increasing order toward right direction.

Figure 9:
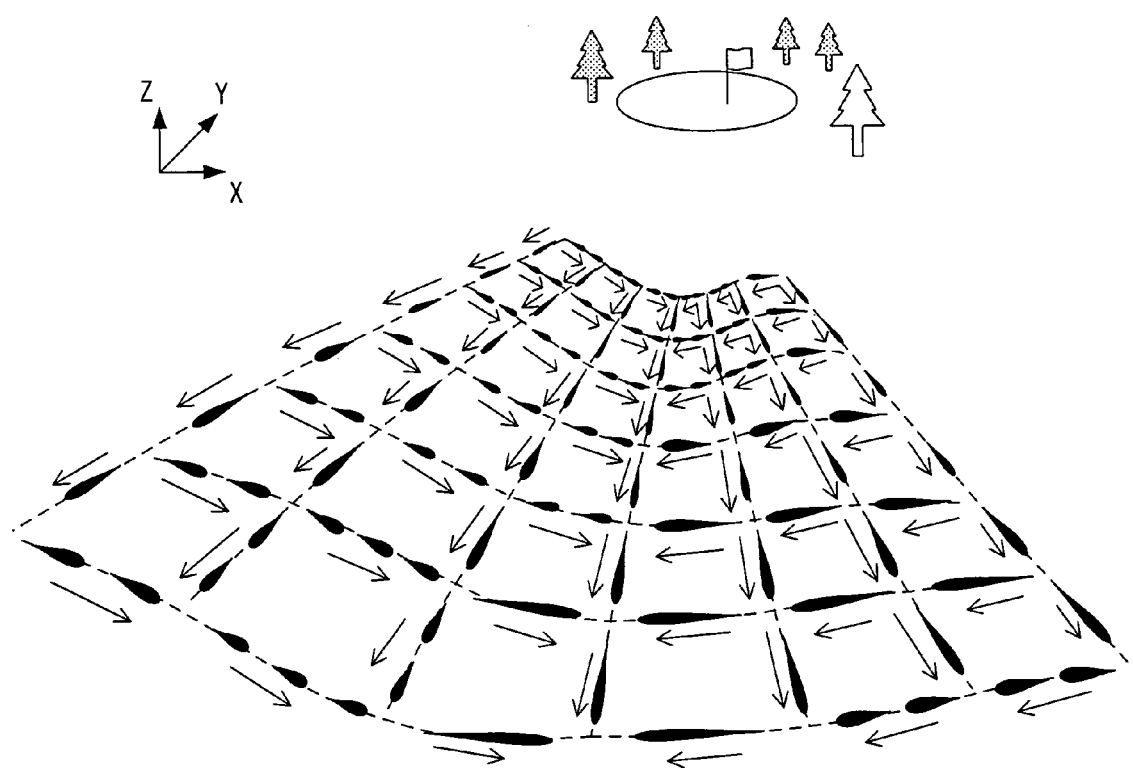
FIG. 9 is an illustrative view showing a state in which grid line textures are pasted on all sections.

When the grid line textures N with respect to all the sections n are selected, that is, the texture table is completed, the selected grid line texture N is pasted on each of the sections n. FIG. 9 shows a state in which the grid line textures N are pasted on all the sections n. As understood from FIG. 9, as the gradient is large, the grid line texture N having a large number of unit images is pasted. It is noted that arrows shown in FIG. 9 indicate directions of the gradients with respect to the respective sections n.

Figure 10:
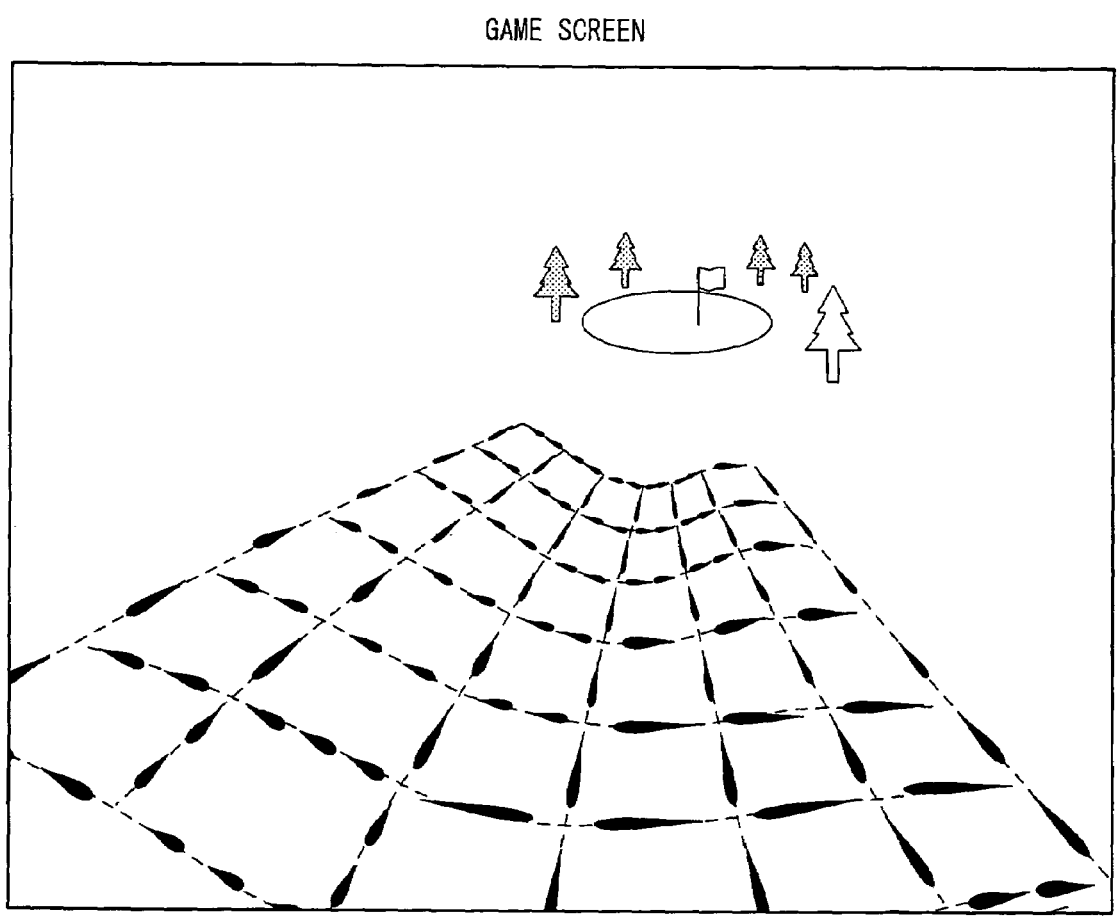
FIG. 10 is an illustrative view showing one example of a game screen displayed on a monitor shown in FIG. 1.

Accordingly, a game screen shown in FIG. 10 is displayed on the monitor 34, for example. Although not illustrated, when the player changes a sight line direction or a direction to be hit, a falling point is changed and therefore, the first reference points and the second reference points are also changed, and thus, a grid according to the changed second reference points is displayed.

Figure 11:
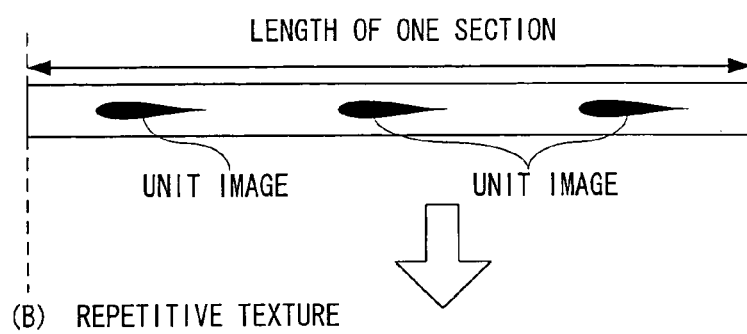
FIG. 11 is an illustrative view showing a grid line texture pasting process.
Figure 11:
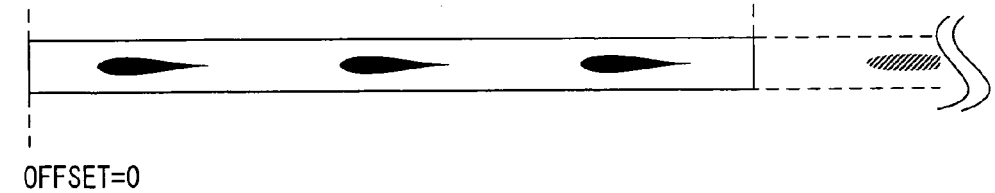
Figure 11:
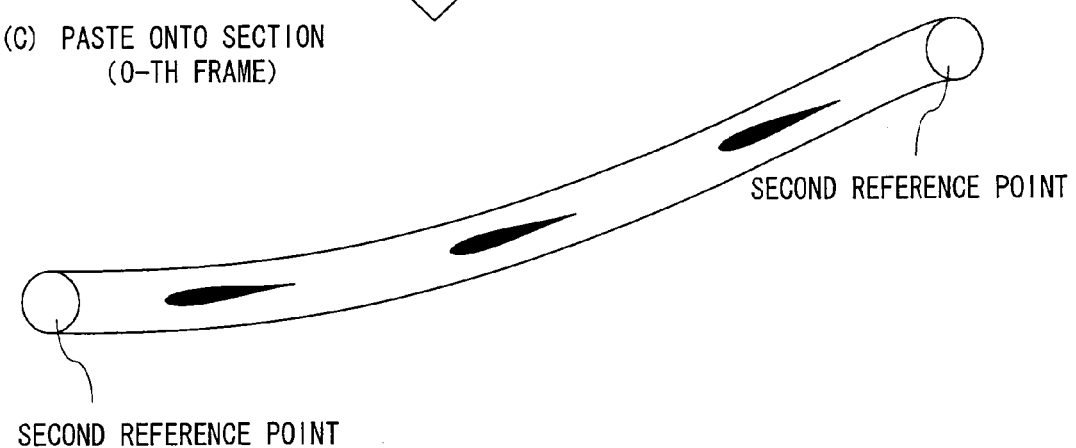

Furthermore, the grid line textures pasted on the respective sections shown in FIG. 9 are rendered (displayed) as if they flow at a constant speed toward the directions of the inclinations (in the directions indicated by the arrows shown in FIG. 9). More specifically, in a case of pasting the grid line texture 3 shown in FIG. 11 (A) on a certain section n, the grid line texture 3 is repeatedly arranged as shown in FIG. 11 (B) so as to generate the repetitive texture. The reason why the repetitive texture is created is as follows. That is, in order to render the grid line itself as if it flows, it is necessary that the texture to be pasted on each section is displaced by a predetermined value from the head position of the grid line texture. Then, for the purpose of preventing a margin at the tail portion caused by displacing the head position, the grid line texture has to be repeated.

It is noted that the repetitive texture is created by use of the grid line texture data included in the image data 404a at an area (working area) different from the program storage area 402 and the data storage area 404 of the main memory 40.

At the start of displaying the grid (for purpose of description, 0-th frame), the offset position is set at the head position of the repetitive texture, and from the offset position, the texture is cut by a length corresponding to one section. Then, the cut texture is, as shown in FIG. 11 (C), pasted on the section n according to the inclination. That is, pasting is performed such that the head of the texture comes to one second reference point lower than another out of the second reference points forming the section n. Furthermore, at this time, the texture is pasted along the inclination of the section n, i.e., the undulations of the land object of the golf course on its surface. The same is true for the following description with respect to pasting the texture.

Figure 12:
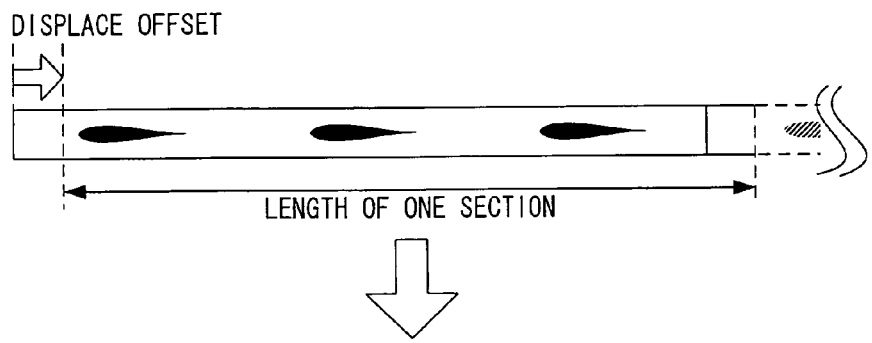
FIG. 12 is an illustrative view showing a grid line texture pasting process.
Figure 12:
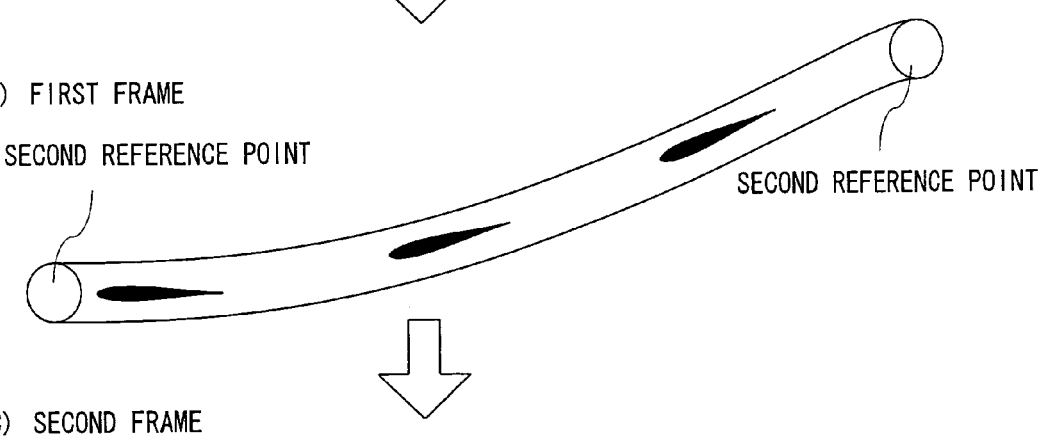
Figure 12:
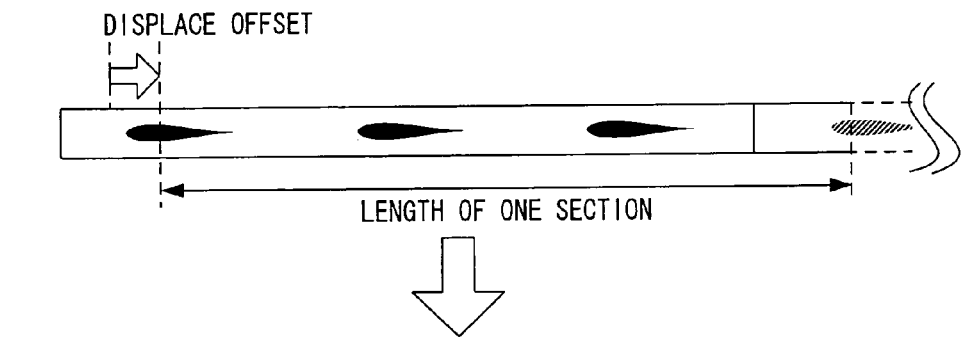
Figure 12:
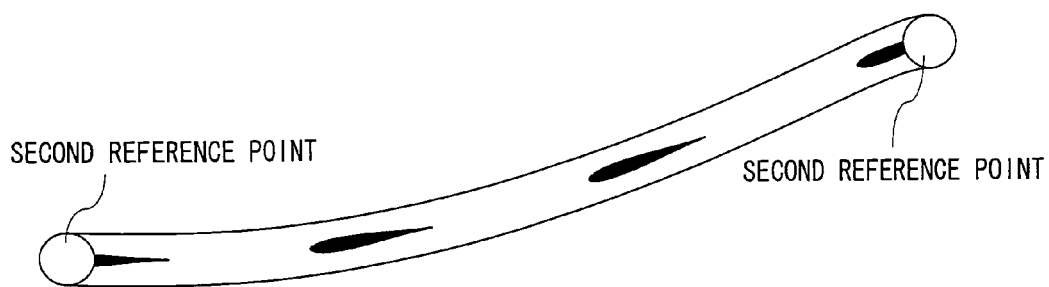

For a next one frame (first frame), as shown in FIG. 12 (A), the offset position is displaced by a predetermined value, and from the offset position displaced by the predetermined value, the texture corresponding to the length of the one section is cut. Then, as shown in FIG. 12 (B), the cut texture is pasted along the inclination on the section n. Thus, by displacing the offset position, the game screen is displayed as if the grid line itself flows along the inclination of the grid.

Furthermore, for a next one frame (second frame), as shown in FIG. 12 (C), the offset is further displaced, and from the displaced offset position, a texture corresponding to the length of one section is cut. Then, as shown in FIG. 12 (D), the texture cut is pasted along the inclination on the section n. Thus, the offset is displaced by the predetermined value every frame and therefore, the grid line itself can be viewed as if it flows at the constant speed. It is noted that the grid line texture is cut by the length of one section after the repetition, and therefore, in the case that the unit image disappears in a direction of one second reference point lower than another second reference point as shown in FIG. 12 (C) and FIG. 12 (D), a new unit image appears in a direction of the higher second reference point.

Such a grid rendering process is executed as to all the sections n. Accordingly, the player can recognize directions of the inclinations by directions of the flows of the grid lines themselves at the sections n. Furthermore, the speeds of the flows are the constant throughout the areas, and therefore, movement of the eyes, when the player views different points within the grid, becomes natural. That is, this makes it possible to provide a screen viewable by the player with ease. The inclinations at a plurality of points can be compared with ease by comparing the number of unit images at these points. In addition, the grid lines themselves flow at the constant speed through the whole area, and therefore, the number of the unit images reached to the end point (second reference point) of each section n per a predetermined time period is different depending on the gradient, and this enables the player to intuitively know the inclination.

Figure 13:
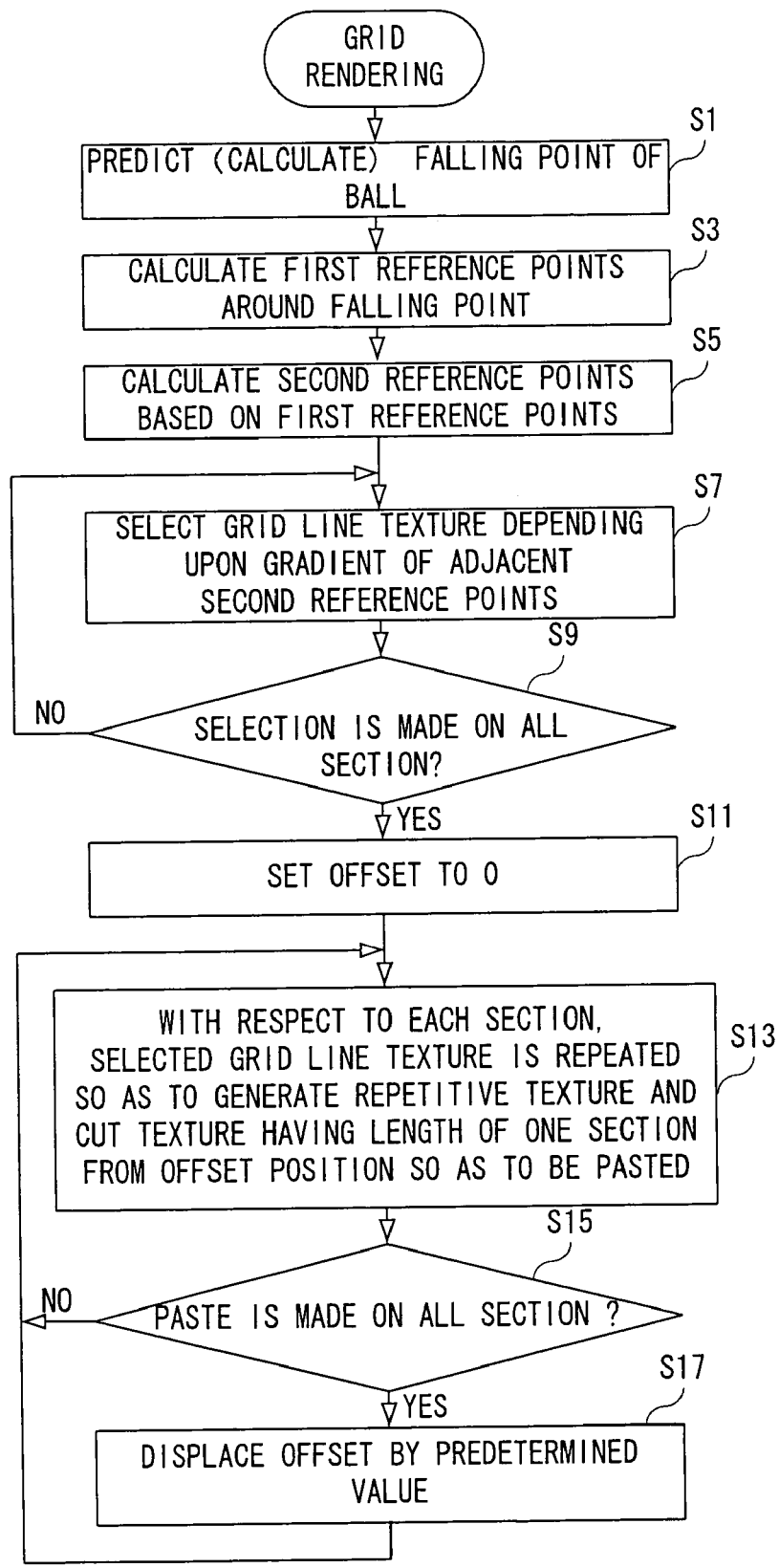
FIG. 13 is a flowchart showing a grid rendering process of a CPU shown in FIG. 2.

More specifically, the CPU 36 shown in FIG. 2 executes a rendering process of the grid according to a flowchart shown in FIG. 13 in conjunction with the GPU 42. As shown in FIG. 13, when starting the grid rendering process, the falling point of the golf ball is predicted (calculated) in a step S1. In a following step S3, the first reference points around the predicted falling point are calculated. That is, the first reference points which are arranged in a matrix form in a manner that the length of each of sections becomes equal making the falling point as a center are calculated.

In a next step S5, the second reference points are calculated on the basis of the first reference points. That is, data of the Z coordinate is added to the first reference points data 404c according to the form of the land configuration (undulations). In a following step S7, the gradients between adjacent second reference points in the X axis direction and Y axis direction are calculated, and the grid line texture N depending upon the gradients are selected. At this time, the selected grid line texture number (N) is registered in the texture table. That is, the texture tale data 404e is renewed.

Then, in a step S9, it is determined whether or not the textures N as to all the sections n are selected. That is, it is determined whether or not the texture table is completed. If "NO" in the step S9, the selection of the grid line textures N as to all the sections n is not completed, the process returns to the step S7. On the other hand, if "YES" in the step S9, that is, the grid line textures N as to all the sections n are selected, the offset is set to "0" in a step S11. That is, the offset is set to the head position of the repetitive texture.

Succeedingly, in a step S13, as to each of the sections n, the selected grid line texture is repeated so as to create the repetitive texture, and the texture is cut from the position indicated by the offset so as to be pasted on the corresponding section n. It is determined whether or not the textures are pasted on all the sections n in a step S15. If "NO" in the step S15, that is, if the paste of the textures for all the sections n is not completed, the process returns to the step S13. On the other hand, if "YES" in the step S15, that is, if the textures are pasted on all the sections, it is determined that rendering of the grid is completed, and the offset is displaced by a predetermined value in a step S17 and then, the process returns to the step S13. The process from the step S13 to the step S17 is repeated at every one frame, and the grid is displayed as if the grid line itself flows along the inclination.

According to this embodiment, the grid is displayed by pasting the grid line textures including the unit images depending upon the gradient of the section and displacing the offset of the textures by the predetermined value at every one frame, and this allows the player to quickly and easily recognize the configuration of the golf course, and this is helpful for his or her golf play.

A game system 10 of another embodiment is the same as the above described embodiment except that a reference texture including one unit image is prepared, the number of the unit images is determined for every section, the texture is reduced depending upon the determined number, and the reduced texture is repeatedly arranged, and therefore, a duplicated description is omitted.

Figure 14:
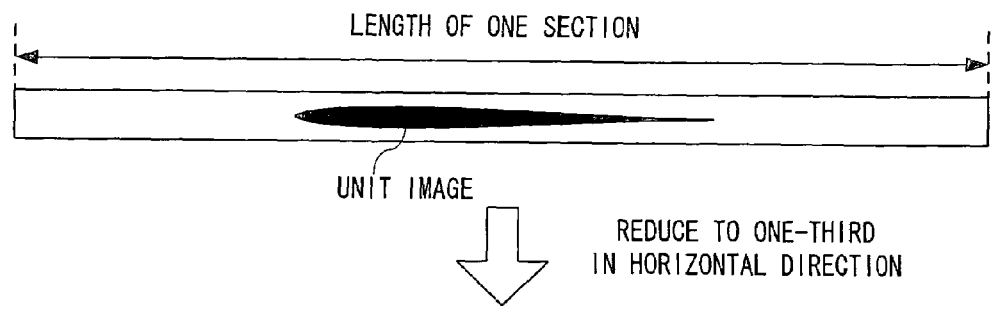
FIG. 14 is an illustrative view showing a grid line texture and its pasting process of another embodiment.
Figure 14:
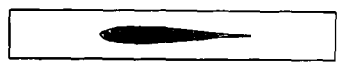
Figure 14:
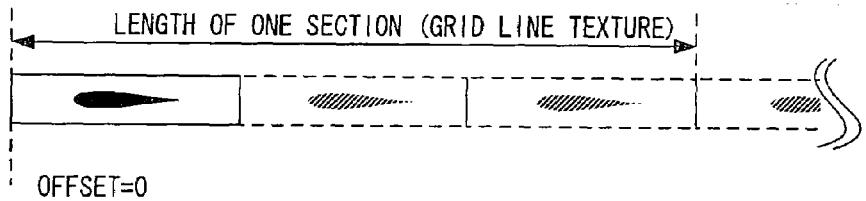
Figure 14:

As shown in FIG. 14 (A), in this embodiment, only one reference texture including one unit image is prepared as described above. The reference texture is the same as the grid texture 1 shown in the above described embodiment. This corresponds to a length of one section, is rendered with a black unit image at the center thereof, and is made as colorless transparent except the unit image.

When a gradient of each section n is calculated on the basis of the coordinates of the second reference points, the number of the unit images corresponding to the gradient is determined. The number of unit images is determined in advance depending upon the gradient, and, when the gradient is calculated, is solely determined. In the same manner as the description by utilizing FIG. 7 (A) and FIG. 7 (B) in the above described embodiment, for a small gradient, it is determined the number of the unit image is one, for a middle gradient, it is determined the number of the unit image is two, and for a large gradient, it is determined the number of the unit image is three. Thus, as the gradient becomes large, the number of the unit images increases.

Accordingly, in this other embodiment, a texture table shown in FIG. 16 is prepared, and the number of the unit images determined is registered therein from the section 1 in order, for example.

When the number of the unit images as to all the sections n is determined, that is, the texture table is completed, the reference texture is reduced depending upon the number of the unit images corresponding to each of the sections n. Accordingly, when the number of the unit images is determined to be three, the reference texture is reduced to one-third of the original length as shown in FIG. 14 (B). The reference texture reduced to one-third of the original length (reduced texture) of three are successively arranged so as to generate a grid line texture. Then, as shown in FIG. 14 (C), the grid line texture is repeatedly arranged so as to generate a repetitive texture. At a start of displaying a grid (for convenience of description, a 0-th frame), an offset is set at the head position of the repetitive texture, and from the position indicated by the offset, a texture corresponding to one section is cut. Then, as shown in FIG. 14 (D), the cut texture is pasted on the section n along the inclination.

It is noted that a pasting method of the texture is the same as that in the above described embodiment, and therefore, a duplicated description is omitted.

Figure 15:
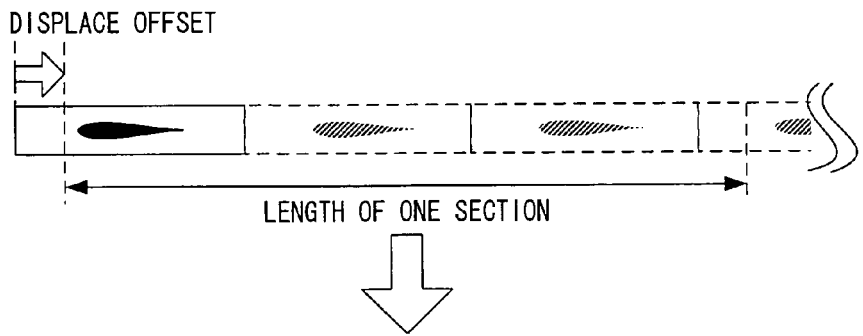
FIG. 15 is an illustrative view showing a grid line texture pasting process of FIG. 14 embodiment.
Figure 15:
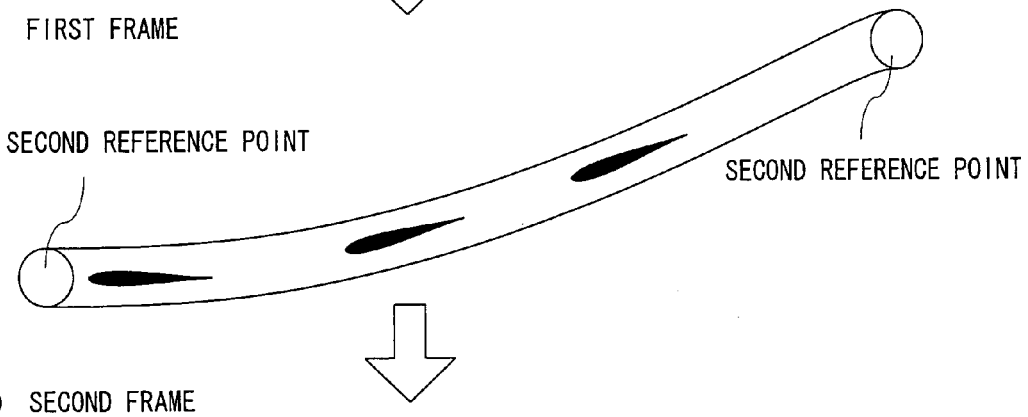
Figure 15:
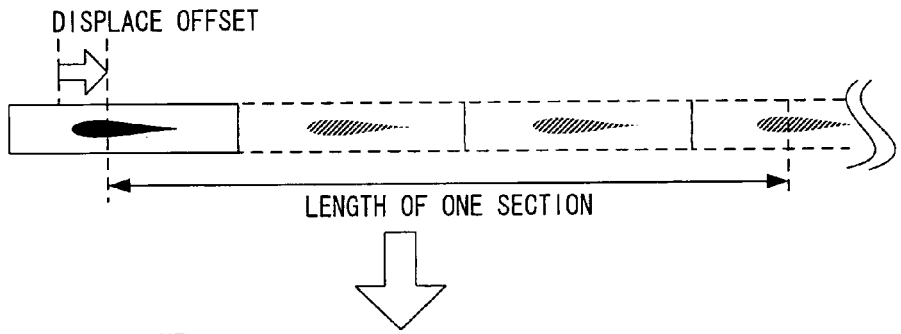
Figure 15:
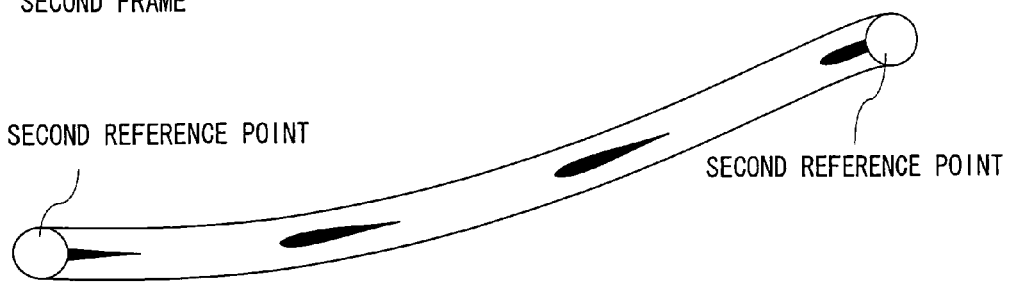

For a next one frame (first frame), as shown in FIG. 15 (A), the offset is displaced by a predetermined value, and from the offset position displaced by the predetermined value, the texture corresponding to the length of one section is cut. Then, as shown in FIG. 15 (B), the cut texture is pasted on the section n along the inclination. Thus, the grid is displayed as if the grid line itself flows in the inclined direction.

Furthermore, for a next one fame (second frame), as shown in FIG. 15 (C), the offset is further displaced by the predetermined value, and from the offset position displaced, the texture corresponding to the length of one section is cut. Then, as shown in FIG. 15 (D), the texture cut is pasted along the inclination. Thus, the offset is displaced by the predetermined value, and therefore, the grid is displayed as if the grid itself flows at a constant speed.

Also in this embodiment, similarly to the above-described embodiment, the grid line texture depending upon the gradient can be pasted, and in addition, the grid line itself can be displayed as if it flows in the inclined direction at the constant speed.

Figure 17:
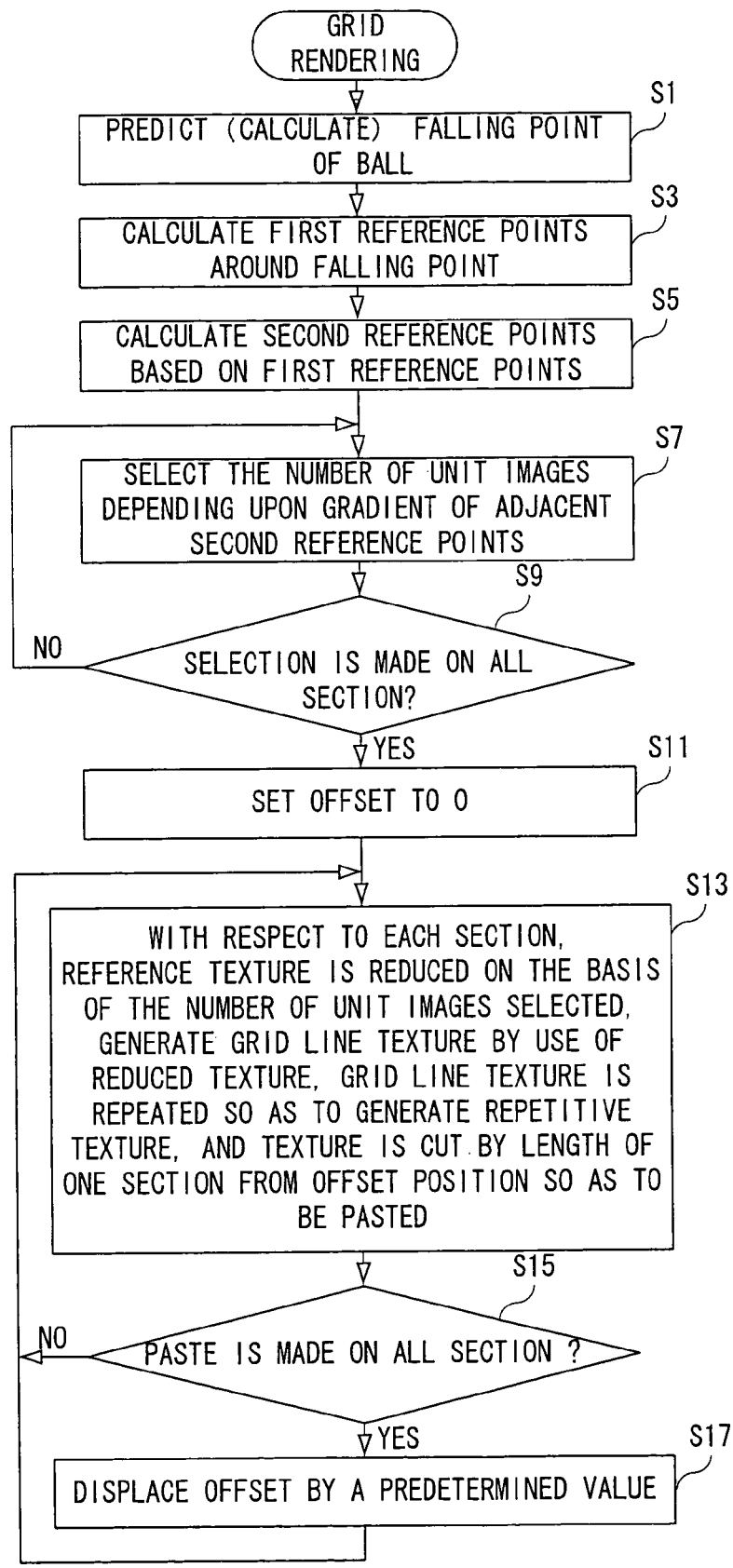
FIG. 17 is a flowchart showing a grid rendering process of a CPU of FIG. 14 embodiment.

More specifically, the CPU 36 executes a rendering process of the grid according to a flowchart shown in FIG. 17 in conjunction with the GPU 42. It is noted that the rendering process is approximately the same as the rendering process shown in FIG. 13, and therefore, a duplicated description is omitted.

As shown in FIG. 17, a gradient between adjacent second reference points is calculated, and the number of unit images corresponding to the calculated gradient is selected (determined) in a step S7'. Then, the number is registered in the texture table shown in FIG. 16.

Furthermore, in a step S13', a reference texture is reduced on the basis of the number of unit images selected as to each of all the sections, that is, a reduced texture is generated. The reduced texture is repeatedly arranged so as to generate a grid line texture. Then, the generated grid line texture is repeated so as to create a repetitive texture, and the texture is cut at the position indicated by the offset so as to be pasted on the section n.

In this other embodiment also, it is possible to easily and rapidly recognize the configuration. In addition, only one reference texture is prepared, and therefore, it is possible to decrease a data amount.

It is noted in the above-described embodiment, a description is made on the game system separately provided with the video game apparatus and the monitor; however, it is needless to say that the game system is also applied to a computer such as a portable game apparatus provided with the monitor and the game apparatus in a integrated manner, a cellular phone provided with a game function, a PDA, a laptop-type PC and etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a land object rendering means for rendering a land object in a 3-dimension virtual space; and
   a grid rendering means for rendering a grid on a surface of said land object,
   said grid rendering means displaying said grid by combining a plurality of grid lines with each other in vertical and horizontal directions,
   said grid including a plurality of sections sectioned by intersecting points of said grid lines in the vertical direction and in the horizontal direction, and
   each of said plurality of grid lines being constructed by a series of grid line elements which are elements for forming said grid line in a plural number, wherein
   said grid rendering means includes the number of elements determining means for making the number of the grid line elements included in each of said sections different depending upon a gradient of the surface of said land object at a position corresponding to each of said sections so that the grid lines of the vertical direction and the grid lines of the horizontal direction can be displayed, and a flow rendering means for performing rendering as if said grid lines each formed by said grid line elements having the number determined by said number of elements determining means flow toward an inclined direction at a constant speed on the surface of said land object.

2. An image processing apparatus according to claim 1, further comprising:
   a grid line element changing means for changing a length of said grid line element depending upon the number determined by said number of elements determining means, wherein
   said flow rendering means performs rendering as if the grid lines each having the series of grid line elements changed in length by said grid line element changing means flow toward the inclined direction of the surface of said land object at a constant speed.

3. An image processing apparatus according to claim 1, wherein said grid line elements have visual directivity,
   said flow rendering means performs rendering such that a front direction of said grid line elements becomes coincident with the inclined direction of the surface of said land object.

4. An image processing apparatus according to claim 1, wherein said land object is a land object of a virtual golf course, and the invention further comprising an operating means for inputting operating information by a player, wherein
   a virtual golf game is performed in said golf course in response to an operation of said operating means.

5. An image processing program executed by an image processing apparatus having a land object rendering means for rendering a land object in a 3-dimension virtual space and a grid rendering means for rendering a grid on a surface of said land object, said program making said grid rendering means execute
   a displaying step for displaying said grid by combining a plurality of grid lines with each other in vertical and horizontal directions,
   said grid including a plurality of sections sectioned by intersecting points of said grid lines of the vertical direction and said grid lines of the horizontal direction,
   each of said plurality of grid lines being constructed by a series of grid line elements being elements for forming said grid line in a plural number,
   the number of elements determining step for making the number of the grid line elements included in each of said sections different depending upon a gradient of the surface of said land object at a position corresponding to each of said sections so that said grid lines of the vertical direction and said grid lines of the horizontal direction can be displayed, and a flow rendering step for performing rendering as if said grid lines each formed by said grid line elements having the number determined by said number of elements determining step flow toward an inclined direction at a constant speed on the surface of said land object.

6. An image processing method comprising:

rendering grid lines on a surface of an object;

generating one or more moving grid line elements for each grid line, wherein the number of grid line elements for each respective grid line is based on a gradient of a portion of the surface of the object on which the respective grid line is rendered and the grid line elements for all the grid lines have the same, constant moving speed.

7. The image processing method according to claim 6, wherein the grid line elements each have a head section and a tail section.

8. The image processing method according to claim 6, wherein the number of grid line elements increases as the gradient increases.

9. The image processing method according to claim 6, wherein the number of grid line elements for each respective grid line is stored in a data table.

10. The image processing method according to claim 6, wherein the one or more grid line elements for each grid line are generated from textures each comprising one or more grid line elements.

11. The image processing method according to claim 10, wherein the moving of the grid line elements is effected by displacing offset positions of the textures every display frame.

12. The image processing method according to claim 6, wherein the one or more grid line elements for each grid line are generated from a reference texture.

13. A computer-readable medium having stored thereon an image processing program for execution by a processing system of an image processing apparatus, the image processing program comprising:

a rendering process for rendering grid lines on a surface of an object;

a grid line element generating process for generating one or more moving grid line elements for each grid line, wherein the number of grid line elements for each respective grid line is based on a gradient of a portion of the surface of the object on which the respective grid line is rendered and the grid line elements for all the grid lines have the same, constant moving speed.

14. The image processing program according to claim 13, wherein the grid line elements each have a head section and a tail section.

15. The image processing program according to claim 13, wherein the number of grid line elements increases as the gradient increases.

16. The image processing program according to claim 13, wherein the number of grid line elements for each respective grid line is stored in a data table.

17. The image processing program according to claim 13, wherein the grid line elements are parts of textures having lengths corresponding to the length of the grid lines.

18. The image processing program according to claim 17, wherein the moving of the grid line elements is effected by displacing offset positions of the textures every display frame.

19. The image processing method according to claim 13, wherein the one or more grid line elements for each grid line are generated from a reference texture.

20. An image processing apparatus comprising:

means for rendering grid lines on a surface of an object; and means for generating one or more moving grid line elements for each grid line, wherein the number of grid line elements for each respective grid line is based on a gradient of a portion of the surface of the object on which the respective grid line is rendered and the grid line elements for all the grid lines have the same, constant moving speed.

21. The image processing apparatus according to claim 20, wherein the grid line elements each have a head section and a tail section.

22. The image processing apparatus according to claim 20, wherein the number of grid line elements increases as the gradient increases.

23. The image processing apparatus according to claim 20, wherein the number of grid line elements for each respective grid line is stored in a data table.

24. The image processing apparatus according to claim 20, wherein the grid line elements are parts of textures having lengths corresponding to the length of the grid lines.

25. The image processing apparatus according to claim 24, wherein the moving of the grid line elements is effected by displacing offset positions of the textures every display frame.

26. The image processing method according to claim 20, wherein the one or more grid line elements for each grid line are generated from a reference texture.

* * * * *